(12) United States Patent
Hsu

(10) Patent No.: US 8,520,016 B2
(45) Date of Patent: Aug. 27, 2013

(54) INSTRUCTION FOLDING MECHANISM, METHOD FOR PERFORMING THE SAME AND PIXEL PROCESSING SYSTEM EMPLOYING THE SAME

(75) Inventor: R-Ming Hsu, Jhudong Township (TW)

(73) Assignee: Taichi Holdings, LLC, Wilmington, DE (US)

( * ) Notice: Subject to any disclaimer, the term of this patent is extended or adjusted under 35 U.S.C. 154(b) by 196 days.

(21) Appl. No.: 12/400,127

(22) Filed: Mar. 9, 2009

(65) Prior Publication Data

US 2010/0177096 A1 Jul. 15, 2010

Related U.S. Application Data

(63) Continuation of application No. 11/333,479, filed on Jan. 17, 2006, now Pat. No. 7,502,029.

(51) Int. Cl.
*G06T 1/00* (2006.01)
*G06T 15/00* (2011.01)
*G06F 15/00* (2006.01)
*G06F 9/00* (2006.01)

(52) U.S. Cl.
USPC ............................ 345/522; 712/221; 712/241

(58) Field of Classification Search
USPC ....................................................... 345/522
See application file for complete search history.

(56) References Cited

U.S. PATENT DOCUMENTS

| | | | |
|---|---|---|---|
| 4,439,828 A | 3/1984 | Martin | |
| 5,163,139 A | 11/1992 | Haigh et al. | |
| H1291 H | 2/1994 | Hinton et al. | |
| 5,504,932 A * | 4/1996 | Vassiliadis et al. | ............ 712/208 |
| 5,522,078 A | 5/1996 | Matsuzuki | |
| 5,634,118 A | 5/1997 | Blomgren | |
| 5,826,089 A | 10/1998 | Ireton | |
| 5,878,242 A | 3/1999 | Olson et al. | |
| 5,881,307 A | 3/1999 | Park et al. | |
| 5,896,519 A | 4/1999 | Worrell | |
| 5,925,123 A | 7/1999 | Tremblay et al. | |
| 6,026,485 A * | 2/2000 | O'Connor et al. | ............ 712/226 |

(Continued)

OTHER PUBLICATIONS

Kim et al., Advanced POC Model-Based Java Instruction Folding Mechanism, Sep. 5-7, 2000, pp. 332-338, Proceedings of the 26th EUROMICRO Conference, IEEE.*

(Continued)

*Primary Examiner* — M Good Johnson

(57) ABSTRACT

An instruction folding mechanism, a method for performing the instruction folding mechanism and a pixel processing system employing the instruction folding mechanism are described. The pixel processing system comprises an instruction folding mechanism and a pixel shader. The instruction folding mechanism folds a plurality of first instructions in a first program to generate a second program having at least one second instruction which is a combination of the first instructions. The pixel shader connected to the instruction folding mechanism fetches the second program to decode at least the second instruction having the combination of the first instructions to execute the second program. The instruction folding mechanism comprises an instruction scheduler, a folding rule checker, and an instruction combiner. The instruction scheduler connected to the folding rule checker is used to scan the first instructions according to static positions in order to schedule the first instructions in the first program. The folding rule checker checks the first instructions according to a folding rule whether the first instructions has data independency. The instruction combiner connected to the folding rule checker can combine the first instructions having the data independency to generate at least the second instruction.

46 Claims, 9 Drawing Sheets

(56) References Cited

U.S. PATENT DOCUMENTS

| | | | |
|---|---|---|---|
| 6,081,884 A | 6/2000 | Miller | |
| 6,108,768 A | 8/2000 | Koppala et al. | |
| 6,125,439 A | 9/2000 | Tremblay et al. | |
| 6,128,720 A | 10/2000 | Pechanek et al. | |
| 6,148,391 A | 11/2000 | Petrick | |
| 6,237,086 B1* | 5/2001 | Koppala et al. | 712/226 |
| 6,301,651 B1* | 10/2001 | Chang et al. | 712/202 |
| 6,349,383 B1 | 2/2002 | Col et al. | |
| 6,377,261 B1 | 4/2002 | Fernandez et al. | |
| 6,453,407 B1 | 9/2002 | Lavi et al. | |
| 6,775,765 B1 | 8/2004 | Lee et al. | |
| 6,825,843 B2 | 11/2004 | Allen et al. | |
| 6,832,307 B2* | 12/2004 | Richardson | 712/213 |
| 6,980,209 B1 | 12/2005 | Donham et al. | |
| 7,000,094 B2* | 2/2006 | Nevill et al. | 712/209 |
| 7,127,590 B1 | 10/2006 | Lindquist | |
| 7,210,127 B1* | 4/2007 | Rangachari | 717/128 |
| 7,281,122 B2* | 10/2007 | Rubin et al. | 712/226 |
| 7,324,106 B1* | 1/2008 | Cabral et al. | 345/426 |
| 7,584,342 B1* | 9/2009 | Nordquist et al. | 712/22 |
| 7,600,221 B1* | 10/2009 | Rangachari | 717/128 |
| 7,633,505 B1* | 12/2009 | Kelleher | 345/504 |
| 7,643,032 B2* | 1/2010 | Wetzel et al. | 345/582 |
| 7,681,187 B2* | 3/2010 | Ludwig et al. | 717/151 |
| 7,809,928 B1* | 10/2010 | Allen et al. | 712/208 |
| 7,836,282 B2 | 11/2010 | Ban et al. | |
| 7,844,804 B2 | 11/2010 | Rychlik | |
| 2002/0057446 A1 | 5/2002 | Long et al. | |
| 2002/0087955 A1 | 7/2002 | Ronen et al. | |
| 2003/0046519 A1* | 3/2003 | Richardson | 712/226 |
| 2004/0268087 A1* | 12/2004 | Rupley et al. | 712/24 |
| 2005/0198473 A1 | 9/2005 | Ford | |
| 2005/0253861 A1* | 11/2005 | Hutchins et al. | 345/561 |
| 2005/0267996 A1* | 12/2005 | O'Connor et al. | 710/1 |
| 2006/0005178 A1* | 1/2006 | Kilgard et al. | 717/153 |
| 2006/0225061 A1* | 10/2006 | Ludwig et al. | 717/161 |
| 2008/0098206 A1 | 4/2008 | Naoi | |
| 2008/0252652 A1* | 10/2008 | Jiao et al. | 345/582 |

OTHER PUBLICATIONS

Ton et al., "Instruction Folding in Java Processor," IEEE Explore, pp. 138-143, Dec. 1997.

Ton, et al., "Design of an Optimal Folding Mechanism for Java Processors," *Microprocessors and Microsystems*, vol. 26, Issue 8, Nov. 2002, pp. 341-352.

Non-Final Office Action on U.S. Appl. No. 13/437,397, mailed Jun. 28, 2012.

Non-Final Office Action on U.S. Appl. No. 13/437,397, mailed Dec. 5, 2012.

Kim, A., "An Advanced Instruction Folding Mechanism for a Stackless Java Processor" Computer Design, 2000, IEEE Proceedings 2000 International Conference on, Sep. 17, 2000, pp. 565-566.

Final Office Action on U.S. Appl. No. 13/437,397, mailed Apr. 22, 2013.

* cited by examiner

| R | G | B | A |
|---|---|---|---|

3:1 ⏟ from Inst. 1 (R,G,B) ⏟ from Inst. 2 (A)

2:2 ⏟ from Inst. 1 (R,G) ⏟ from Inst. 2 (B,A)

FIG. 3B (Prior Art)

| R | G | B | A |
|---|---|---|---|

⏟ from Inst. 1 (R,G,B) ⏟ from Inst. 2 (A)

FIG. 3A (Prior Art)

INSTRUCTION FOLDING MECHANISM, METHOD FOR PERFORMING THE SAME AND PIXEL PROCESSING SYSTEM EMPLOYING THE SAME

CROSS-REFERENCE TO RELATED APPLICATIONS

This application is a continuation of U.S. patent application Ser. No. 11/333,479, entitled "Instruction Folding Mechanism, Method For Performing The Same And Pixel Processing System Employing The Same," filed Jan. 17, 2006 (now U.S. Pat. No. 7,502,029).

FIELD OF THE INVENTION

The present invention relates to a folding mechanism, a method for performing the folding mechanism and a pixel processing system employing the same, and more particularly to an instruction folding mechanism, a method for performing the instruction folding mechanism and a pixel processing system employing the instruction folding mechanism applied to a graphic processor unit (GPU).

BACKGROUND OF THE INVENTION

FIG. 1 is a block diagram of a pipeline configuration of a conventional graphic processor unit. The conventional graphic processor unit 100 mainly includes a triangle setup unit 102, a pixel processing unit 104 and a depth processing unit 106. The pixel processing unit 104 has a pixel shader 108, a texture unit 110 and a color interpolator 112 both connected to the pixel shader 108.

A surface of three-dimensional (3D) object is divided into a plurality of triangles two-dimensionally arranged in terms of their neighboring relationship and having an arbitrary size. Each of the triangles has three vertices which are forwarded to the triangle setup unit 102. The triangle setup unit 102 outputs the parameters of the pixels, such as the positions of the pixels in triangles and texture coordinates of the vertices of the corresponding triangles, to the pixel processing unit 104. In the pixel processing unit 104, based on the positions of the pixels and texture coordinates of the vertices, the texture unit 110 interpolates the texture coordinates for all the pixels. The interpolated texture coordinates of the pixels are inputted and then processed in the pixel shader 108 (with DirectX terms, or Fragment Processor in OpenGL terms). Next, the pixel shader 108 executes a texture load instruction to return the processed texture coordinates to the texture unit 110. Based on the unprocessed texture coordinates and the processed texture coordinates, the texture unit 110 samples the texture colors of the pixels in a texture map and outputs the texture colors to the pixel shader 108. Meanwhile, based on the positions of the pixels and texture coordinates of the vertices, the color interpolator 112 interpolates the vertex colors for all the pixels and outputs the vertex colors of the pixels to the pixel shader 108. The pixel shader 108 then processes the texture colors and the vertex colors of the pixels and outputs color values and depth values of the pixels to the depth processing unit 106, the final pixel colors are obtained. The final pixel colors are then becoming available for drawing the whole frame.

FIG. 2 is a block diagram of an example program in a pixel shader of the conventional graphic processor. The pixel shader 108 usually includes five kinds of registers: temporary registers $r_n$ for storing temporary data, texture coordinate registers $t_n$, texture numbering registers $s_n$, vertex color registers $v_n$, and outputting registers $_oc_n$ for transforming the final pixel colors to the depth processing unit 106.

The process of the pixel shader 108 normally has four stages: a coordinate calculation stage, a texture processing stage, a color blending stage and an issue out stage. The interpolated texture coordinates of the pixels from the texture unit 110 are stored in the texture coordinates registers $t_n$. In the coordinate calculation stage, the arithmetic, for the interpolated texture coordinates of the pixels from the texture unit 110, is conducted in the texture coordinates registers $t_n$ and the temporary registers $r_n$; the arithmetic results, i.e. the processed texture coordinates, are stored in the temporary registers $r_n$. In the texture processing stage, based on the texture coordinates in the registers $t_n$ and $r_n$, the pixel shader 108 executes texture load instructions to postulate the texture unit 110 to sample texture colors of the pixels in a texture map. The texture map is appointed by the texture numbering registers $s_n$. The sampled texture colors are transformed to the temporary registers $r_n$. In the color blending stage, the pixel shader 108 blends the texture colors stored in the temporary registers $r_n$ with the vertex colors from the color interpolator 112 and the blending result is stored in the vertex color registers $v_n$. In the issued stage, the pixel shader 108 outputs color and depth values of the pixels to the depth processing unit 106. It should be noted that the coordinate calculation stage, the texture processing stage and the color blending stage may be repetitiously processed or be omitted, respectively.

Each of the registers is composed of four components, e.g. (x, y, z, w) or (r, g, b, a) which are so-called four-wide vectors and data format of floating point. In the coordinate calculation and texture processing stages, the four components (x, y, z, w) represent coordinates in a three-dimensional (3D) space or of different texture formats. In the color blending and issued stage, the four components (r, g, b, a) represent three primary colors of red, green and blue, and transparency. The components of source and target registers are assigned to instructions to read out or write the components. For example, r0.w represents the instructions that can read out or write component "w" of register "r0".

Since processing steps of color components "r", "g", and "b" are considerably different from the transparency component "a", there is a need of two independent pipelines to process these different kinds of components. When representing coordinates, "x", "y" and "z" are also considerably different from the perspective component "w". In DirectX standard, two independent pipelines are serially merged and concurrently issued out by a plus sign "+" preceding the second instruction of the pair, which is defined as instruction pairing or co-issue and has a component ratio of 3 to 1, as shown in FIG. 3A. However, the number of operator decoders, pipelines, register write ports and register read ports for the instructions is increased at least double the amount. Moreover, it is necessary to provide additional complicated functions, such as component selection, format transformation, source modification, and instruction modification in the pixel shader so that instructions can process operands located in the source and target registers. As a result, hardware cost of performing the functions is increased extremely.

Referring to FIG. 3B, a ratio diagram of two color components to two transparency components for the instructions in a conventional pixel shader program is illustrated here. In these two independent instructions, one is used to write color components "r" and "g", and the other is used to write color components "b" and transparency "a". Although the probability of instruction pairing or co-issue is increased, however, it has a more complicated architecture and a higher cost in the hardware of pixel shader. The nVidia Corporation began to implement such complicated co-issue in their GeForce6 Series GPU.

Referring to FIG. 4, a conventional pixel shader with a co-issue mechanism is shown here. The fetcher 400 reads out two instructions from the instruction queue 402 according to the program counter (PC). A pair of decoders (404a, 404b) decodes control signals from the fetched instructions, respectively, to control the pipeline operation of the arithmetic logic units (ALUs) (406a, 406b). The pair of ALU (406a, 406b) implements four vector components in parallel and consumes a pair of register ports (408a, 408b). Each of register ports (408a, 408b) includes three register read ports and a write port. Furthermore, it is necessary to use a source and an instruction modifier for each register port to process component selections and format transformation of source and target operands in the instruction.

Therefore, the co-issue mechanism requires an additional check mechanism to determine the timing of co-issue rule. Furthermore, since source and target registers of the two instructions are different in the timing of co-issue rule, the consumption of register read ports and register write ports are at least doubled the amount. The number of the source modifier and instruction modifier are also at least doubled the amount.

Consequently, there is a need to develop a pixel processing system having an instruction folding mechanism for reducing the hardware cost and increasing performance of graphic processor unit.

SUMMARY OF THE INVENTION

The first objective of the present invention is to provide a folding mechanism applied to a pixel processing system to fold instructions with data independency into reduced instructions for generating a new program.

The second objective of the present invention is to provide a folding mechanism applied to a pixel processing system to fold instructions having an identical target register and output data to different components of the target register to save the hardware cost of pixel processing system.

The third objective of the present invention is to provide a folding mechanism applied to a pixel processing system to improve the performance of the pixel processing system.

According to the above objectives, the present invention sets forth an instruction folding mechanism, a method for performing the folding mechanism and a pixel processing system employing the same. The pixel processing system comprises an instruction folding mechanism and a pixel shader. The instruction folding mechanism folds a plurality of first instructions in a first program to generate a second program having at least one second instruction which is a combination of the first instructions. The pixel shader connected to the instruction folding mechanism fetches the second program to decode at least the second instruction having the combination of the first instructions to execute the second program.

The instruction folding mechanism comprises an instruction scheduler, a folding rule checker, and an instruction combiner. The instruction scheduler connected to the folding rule checker is used to scan the first instructions according to static positions to schedule the first instructions in the first program. Preferably, the instruction scanner successively scans the first instructions. The folding rule checker checks the first instructions according to a folding rule whether the first instructions has data independency. The instruction combiner connected to the folding rule checker can combine the first instructions having the data independency to generate at least the second instruction.

In the relationship of data independency between two adjacent first instructions, the source register of the later first instruction is different from a target register of the former first instruction. In other words, both the source register of the later first instruction and the target register of the former first instruction have a null set. In addition, the data of the two adjacent first instructions is outputted into different components in the target register. In one embodiment, the total number of the source operands of the first and second instructions is within a predetermined threshold value, e.g. 3, 4, or more, so that the decoder can decode the combination of the first instructions.

In operation, a plurality of first instruction in a first program is folded by an instruction folding mechanism to generate a second program having at least one second instruction which is a combination of the first instruction. Afterwards, the second instruction can be fetched according to a program counter. Control signals are decoded from the second instruction having the combination with the first instruction. Then, an operation of a plurality of register components of the second instruction is performed according to the control signal by an ALU. Finally, the register components are selected to transform operand formats of the second instruction by a register port.

The present invention folds instructions with data independency into reduced instructions for generating a new program. The folding instructions have an identical target register and output data to different components of the target register to save the hardware cost of pixel processing system. Because these rules are the most frequently case that the fourth component is separately used, the performance of the expensive co-issue hardware mechanism can be achieve by a much chipper extended decoder.

BRIEF DESCRIPTION OF THE DRAWINGS

FIG. 3A is a ratio diagram of three color components to one transparency component for the instructions in a conventional pixel shader program.

FIG. 3B is a ratio diagram of two color components to two transparency components for the instructions in a conventional pixel shader program.

DETAILED DESCRIPTION OF THE PREFERRED EMBODIMENTS

The present invention is directed to an instruction folding mechanism, a method for performing the instruction folding mechanism and a pixel processing system employing the instruction folding mechanism to fold instructions with data independency into reduced instructions for generating a new program. Furthermore, the instruction folding mechanism is used to fold instructions having an identical target register and outputs data to different components of the target register to save the hardware cost of pixel processing system. It should be noted that the instruction folding mechanism is also suitable for vertex shader, geometric shader or a combination of the two.

Figure 1:
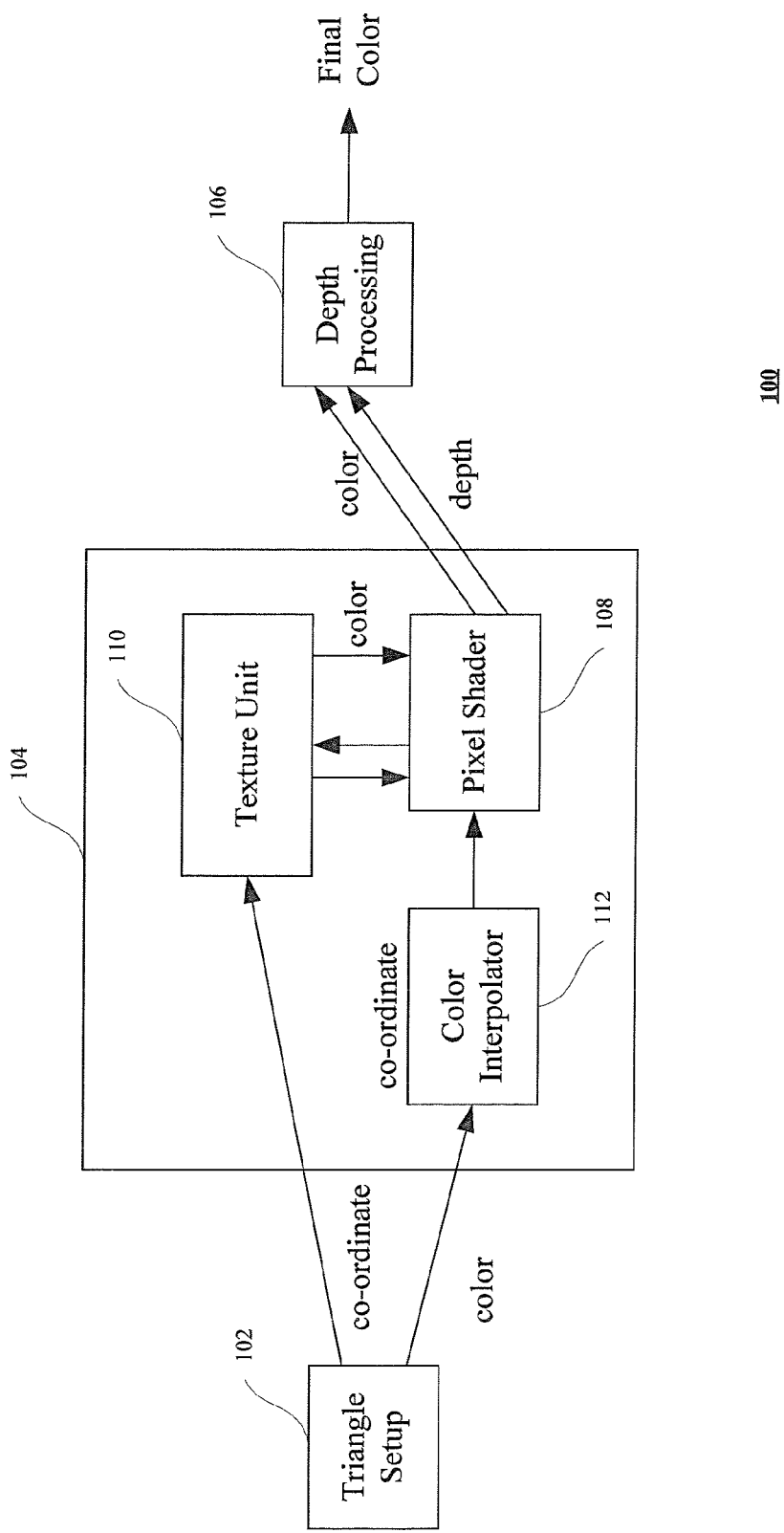
FIG. 1 is a block diagram of a pipeline configuration of a conventional graphic processor unit.
Figure 2:
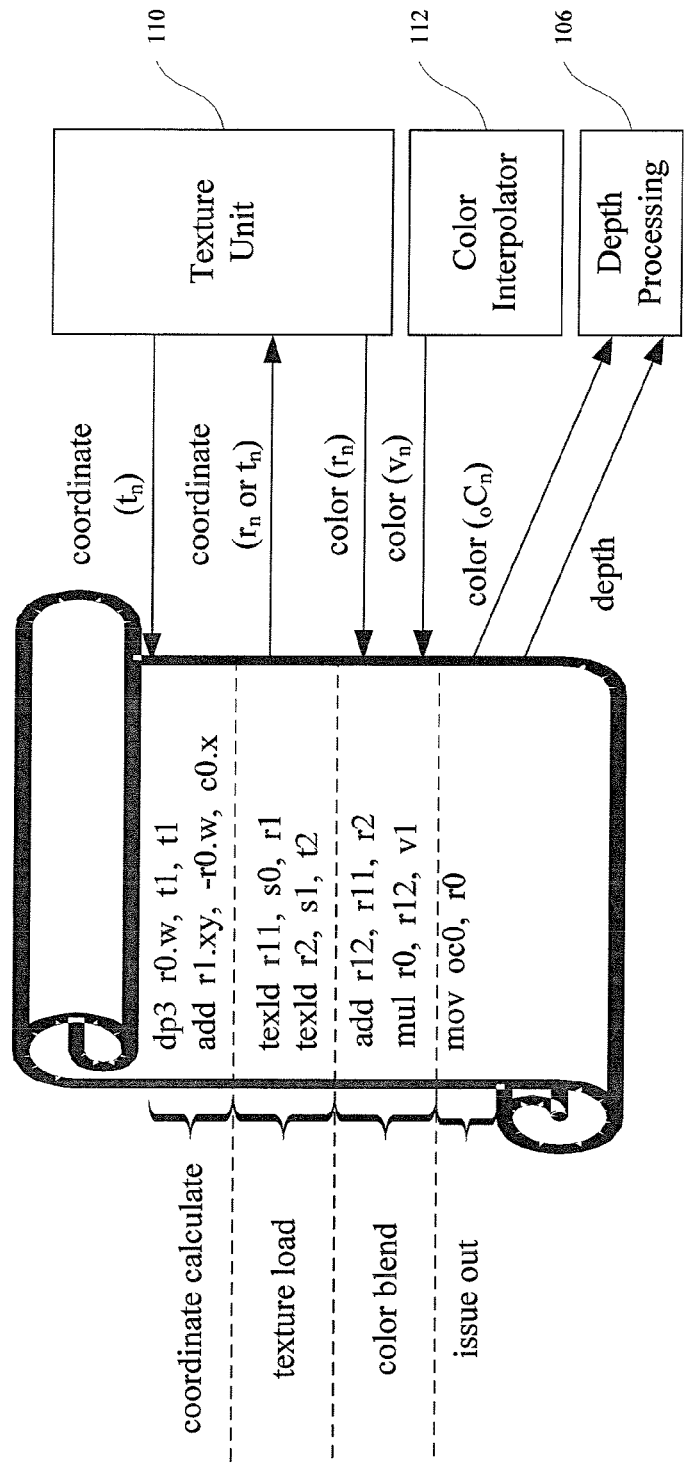
FIG. 2 is a block diagram of an example program in a pixel shader of the conventional graphic processor.
Figure 4:
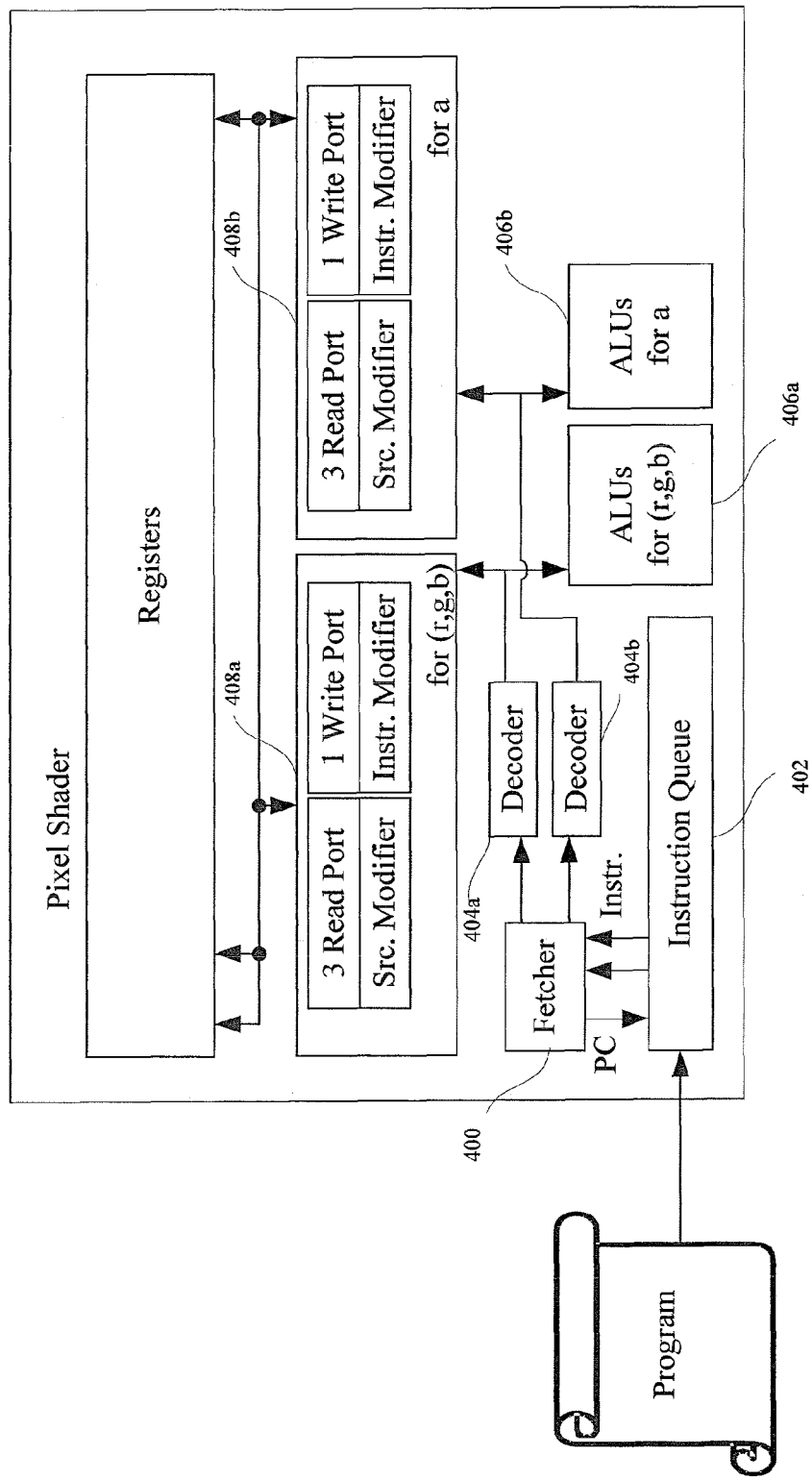
FIG. 4 is a conventional pixel shader with a co-issue mechanism.
Figure 5:
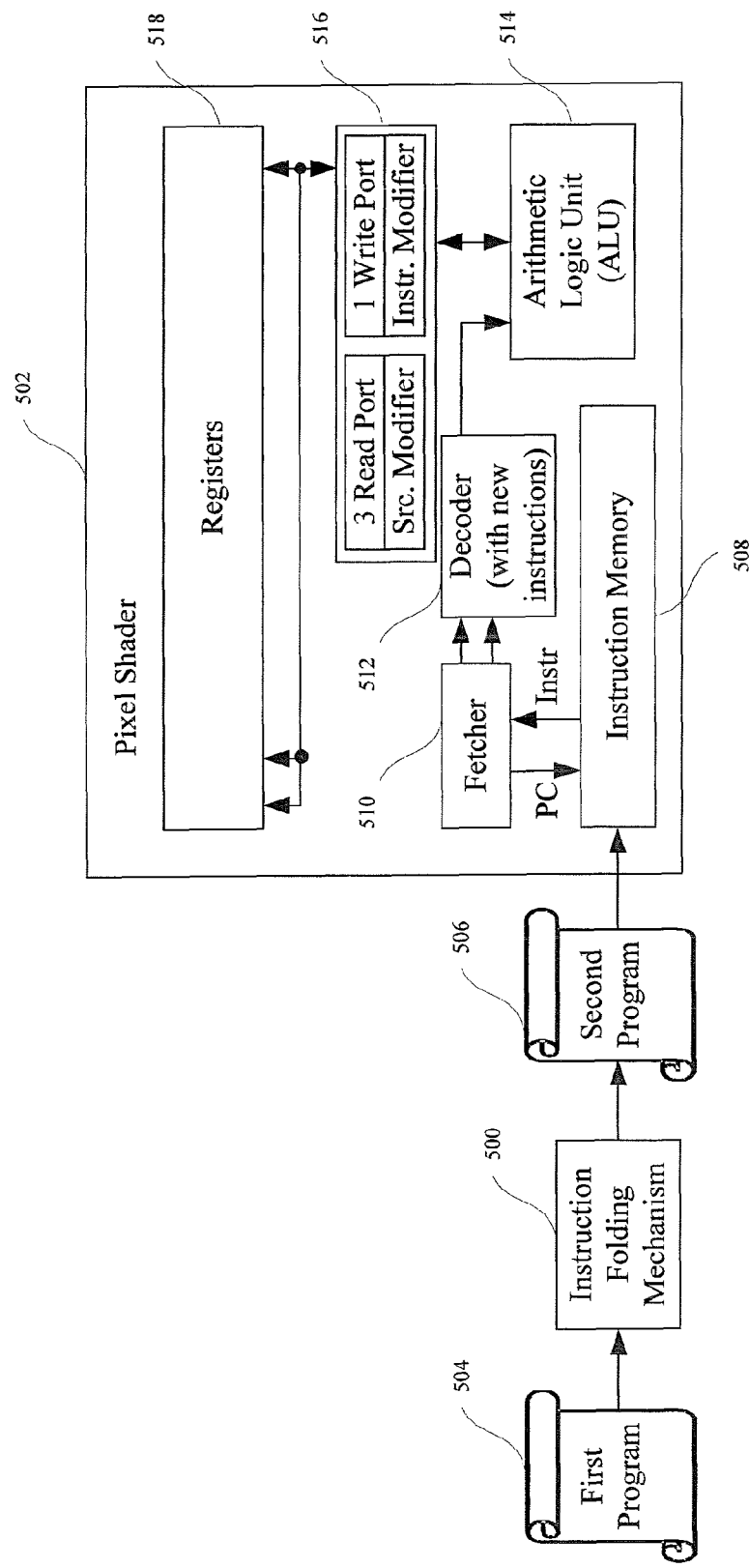
FIG. 5 is a block diagram of a pixel processing system having an instruction folding mechanism according to one preferred embodiment of the present invention.

FIG. 5 is a block diagram of a pixel processing system having an instruction folding mechanism according to one preferred embodiment of the present invention. The pixel processing system comprises an instruction folding mechanism 500 and a pixel shader 502. The instruction folding mechanism 500 folds a plurality of first instruction in a first program 504 to generate a second program 506 having at least one second instruction which is a combination of the first instruction. The pixel shader connected to the instruction folding mechanism 500 fetches the second program 506 to decode at least the second instruction having the combination of the first instruction to execute the second program 506.

Figure 6:
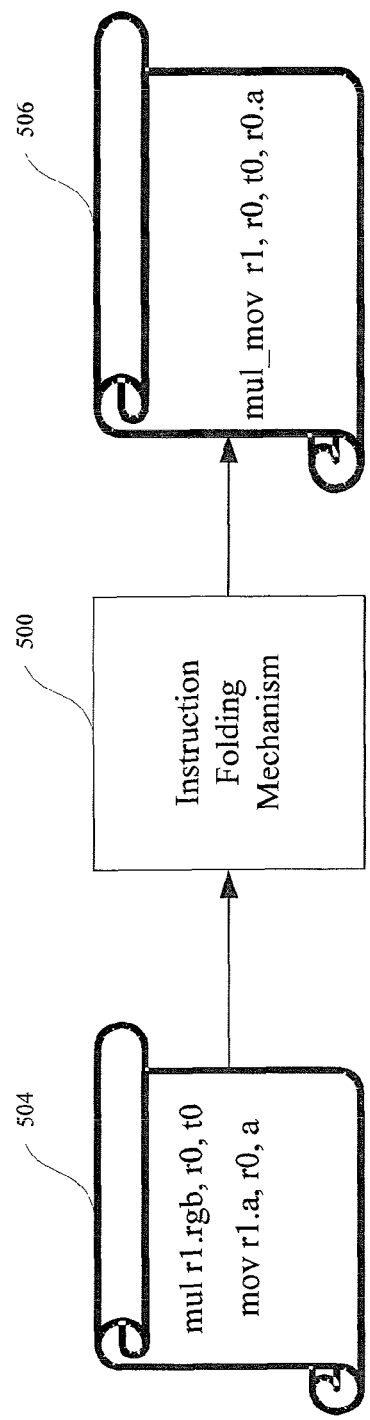
FIG. 6 is a block diagram of an example program applied to the instruction folding mechanism in FIG. 5 according to one embodiment of the present invention.

FIG. 6 is a block diagram of an example program applied to the instruction folding mechanism in FIG. 5 according to one embodiment of the present invention. The data of instruction "mul" is independent in the first program 504 from that of instruction "mov", and the data output of "mul" and "mov" is stored in an identical register, i.e. "$r_1$", but in different components. In one embodiment, the total number of source operands of the data is three, i.e. "r0", "t0", and "r0.a", and it can easily be performed by the instruction folding mechanism to create a new instruction, e.g. "mul_mov", as in the second program 506. Therefore, a decoder can easily decode the new "folded" instruction. Since the instruction of the pixel shader is able to cover the total number of the source operands, an additional operand capacity of the instruction is not required to expand in order to save hardware cost of the pixel shader. However, in the prior art of a co-issue architecture, additional decoders for operators, operation pipelines, register write ports and register read ports for the operator are necessary to be prepared. Furthermore, instructions should be provided with many processing abilities, e.g. component selections, format transformations, source code modifications, and instruction modifications of source and target operands. Therefore, it is important to reduce the number of the operands.

Figure 7:
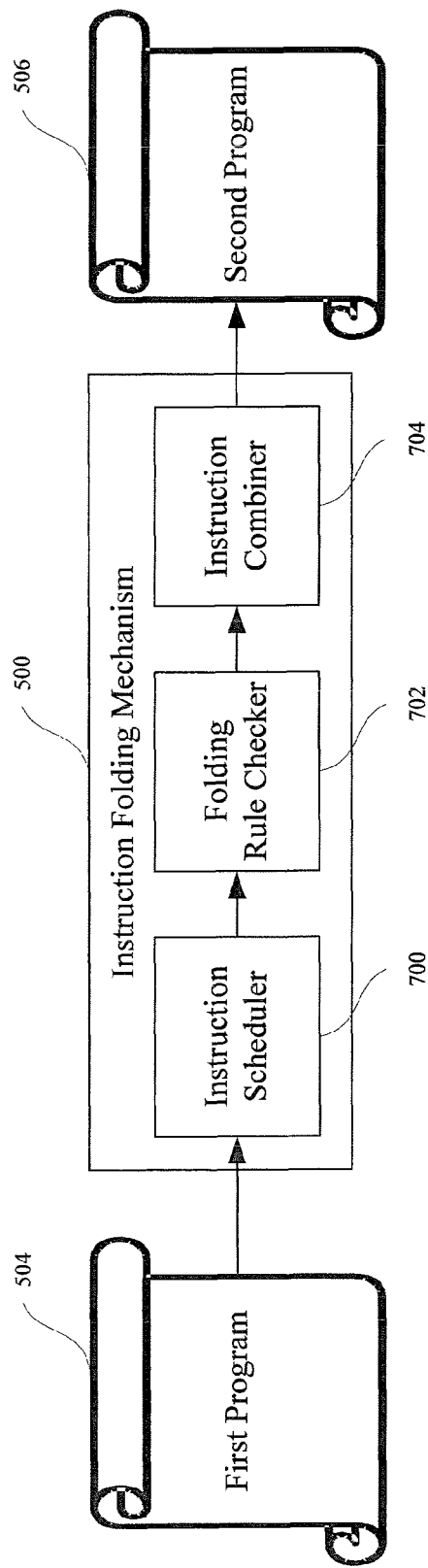
FIG. 7 is a detailed block diagram of the instruction folding mechanism in FIG. 5 according to one embodiment of the present invention.

FIG. 7 is a detailed block diagram of the instruction folding mechanism in FIG. 5 according to one embodiment of the present invention. The instruction folding mechanism 500 comprises an instruction scheduler 700, a folding rule checker 702, and an instruction combiner 704. The instruction scheduler 700 connected to the folding rule checker 702 is used to scan the first instruction according to static positions to schedule the first instruction in the first program 504. Preferably, the instruction scanner 700 successively scans the first instruction. The folding rule checker 702 checks the first instruction according to a folding rule whether the first instruction has data independency. The instruction combiner 704 connected to the folding rule checker 702 can combine the first instruction having the data independency to generate at least the second instruction in the second program 506.

Specifically, in one preferred embodiment of the present invention, a general formula of folding rule is represented as following items:

(1)
OPC1 tgt.[r|g|b], src0, src1
OPC2 tgt.a, src2
OPC1_OPC2 tgt.[r|g|b]a, src0, src1, src2, where tgt.[r|g|b]∩src2=φ.

OPC1 and OPC2 are arbitrary operators and OPC1_OPC2 is a new combination operator indicating an operation instruction which performs OPC1 in components (r, g, b) and OPC2 in component "a". The target operands, tgt.[r|g|b] and tgt.a, of OPC1 and OPC2 are in a same register, i.e. register "tgt", but in different components of "tgt". For example, component "a" is located in OPC1 and OPC2 at the same time. Additionally, the representation [r|g|b] means that components "r", "g", and "b" are not necessarily present but not limited to their presence.

Src0, src1, and src2 are source operands and have arbitrary component(s), where OPC1 is defined as a binary operator having two operands, including operands src0 and src1, or defined as a unary operator including operand src0 only. The formula of tgt.[r|g|b]∩src2=φ represents data independency in viewing of OPC1 and OPC2, which the operation results of OPC1 are irrelevant to that of OPC2. In one embodiment, instruction OPC1 is not required to be adjacent to OPC2 but only if the data of OPC1 is independent from that of OPC2. While taking the orders of instruction OPC1 and OPC2 into consideration, the formula of the folding rule also can be represented as follows:

(2)
OPC2 tgt.a, src2
OPC1 tgt.[r|g|b], src0, src1
OPC1_OPC2 tgt.[r|g|b]a, src0, src1, src2, where tgt.a∩(src0∪src1)=φ.

While instruction OPC1 is a unary operator and OPC2 is a binary operator, the formula of folding rule also can be represented as follows:

(3)
OPC1 tgt.[r|g|b], src0
OPC2 tgt.a, src1, src2
OPC1_OPC2 tgt.[r|g|b]a, src0, src1, src2, where tgt.[r|g|b]∩(src1∪src2)=φ.

(4)
OPC2 tgt.a, src1, src2
OPC1 tgt.[r|g|b], src0
OPC1 OPC2 tgt.[r|g|b]a, src0, src1, src2, where tgt.a∩src0=φ.

When OPC2 is defined as a unary operator in the representation, operand includes src1 only.

In one preferred embodiment of the present invention, component "a" is operated alone and the result is then moved by instruction "mov" while component "a" is a "transparency" or coordinates of fourth dimension in the graphic effect applications. Component "a" is operated by instruction "rsq" to calculate the result of $(1/\sqrt{x})$ while component "a" is a distance or an angle from the light source in the lighting effect applications. While component "[r|g|b]" represents colors or coordinates, instructions "mov", "mul", "add", "mad", and "dp3" are usually used, for example. As a result, in one embodiment, when OPC1 is instructions "mov", "mul", "add", "mad", or "dp3" and OPC2 is "mov" or "rsq", the combination of OPC1_OPC2 can be instructions "mov_mov", "mul_mov", "add_mov", "dp3_mov", "mov_rsq", "mul_rsq", "add_rsq", or "dp3_rsq". In the present invention, a decoder in the hardware is additionally able to decode these instructions of OPC1_OPC2 or other combinations of OPC1 and OPC2 to increase the capability of the pixel shader.

In another preferred embodiment of the present invention, the operands of new instructions of folding rule are four, src0, src1, src2, src3, and instruction "mad" can be used. Although, a register read port and source modifier in the hardware can be added, its cost-effectiveness is better than that of a co-issue mechanism. The general formula of folding rule is represented as follows:

(5)
OPC1 tgt.[r|g|b], src0, src1, src2
OPC2 tgt.a, src3
OPC1_OPC2 tgt.[r|g|b]a, src0, src1, src2, src3, where tgt.[r|g|b]∩src3=φ.

Taking the order of instructions OPC1 and OPC2 into consideration, the formula of folding rule also can be represented as follows:

(6)
OPC2 tgt.a, src3
OPC1 tgt.[r|g|b], src0, src1, src2
OPC1_OPC2 tgt.[r|g|b]a, src0, src1, src2, src3, where tgt.a∩(src0∪src1∪src2)=φ.

When OPC1 is defined as a unary operator, its operand includes src0 only, and when OPC1 is defined as a binary operator, its operands include src0 and src1.

When OPC1 is defined as a unary operator and OPC2 is a triple operator, additional folding rule is described as follows:

(7)
OPC1 tgt.[r|g|b], src0
OPC2 tgt.a, src1, src2, src3
OPC1 OPC2 tgt.[r|g|b]a, src0, src1, src2, src3, where tgt.[r|g|b]∩
(src1∪src2 ∪src3)=φ.
(8)
OPC2 tgt.a, src1, src2, src3
OPC1 tgt.[r|g|b], src0
OPC1_OPC2 tgt.[r|g|b]a, src0, src1, src2, src3, where tgt.a∩src0=φ.

When OPC2 is defined as a unary operator, its operand includes src1 only, and when OPC2 is defined as a binary operator, its operands include src1 and src2.

When OPC1 is defined as a binary operator and OPC2 is a binary operator also, additional folding rule is described as follows:

(9)
OPC1 tgt.[r|g|b], src0, src1
OPC2 tgt.a, src2, src3
OPC1_OPC2 tgt.[r|g|b]a, src0, src1, src2, src3, where tgt.[r|g|b]∩(src2∪src3)=φ.
(10)
OPC2 tgt.a, src2, src3
OPC1 tgt.[r|g|b], src0, src1
OPC1_OPC2 tgt.[r|g|b]a, src0, src1, src2, src3, where tgt.a∩(src0∪src1)=φ.

When OPC1 is defined as a unary operator, its operand includes src0 only, and when OPC2 is defined as binary operator, its operands include src1 and src2. As a result, in one embodiment, when OPC1 is the instruction "mad" and OPC2 is the instructions "mov" or "rsq", the combination of OPC1_OPC2 can be instructions "mad_mov" and "mad_rsq".

In the relationship of data independency between two adjacent first instructions, the source register of the later first instruction is different from a target register of the former first instruction. In other words, both the source register of the later first instruction and the target register of the former first instruction have a null set, e.g. "tgt.[r|g|b]∩src2=φ" in the above-mentioned item (1). The data of the two adjacent first instructions is outputted into different components in the target register. In one embodiment, the total number of the source operands of the first and second instructions is within a predetermined threshold value, e.g. 3, 4, or more, so that the decoder can decode the combination of the first instructions. When the first instructions comprise at least two adjacent first instructions having data dependency, one instruction is written into the second program and the other is checked with a next first instruction according to the folding rule.

Referring to FIG. 5 again, the pixel shader comprises an instruction memory 508, a fetcher 510, a decoder 512, an arithmetic logic unit (ALU) 514, a register port 516, and a register unit 518. The instruction memory 508 is used to store the second instructions of the second program 506. The fetcher 510 connected to the decoder 512 fetches the second instructions stored in the instruction memory 508 according to a program counter. The decoder 512 decodes a control signal from the second instructions having the combination of the first instructions. The ALU 514 connected to the decoder 512 performs an operation of a plurality of register components of the second instructions according to the control signal. The register port connected to the ALU 514 is used to select the register components to transform operand formats of the second instructions. The register unit 518 connected to the register port 516 is employed to store data of the register components of the second instructions.

It should be noted that instruction folding mechanism 500 can be implemented in the forms of software or hardware. If implemented in software, the instruction folding mechanism 500 is a software tool kit running in an operating system (OS), a program loader or a part of a device driver attached to a latter part of a compiler. Furthermore, if implemented in a hardware, the instruction folding mechanism 500 is preferably connected to an instruction fetch unit or a decode unit, i.e. before the instruction queue unit and decoder of the pixel shader in the preferred embodiment, or may be built in a pixel shader.

Figure 8:
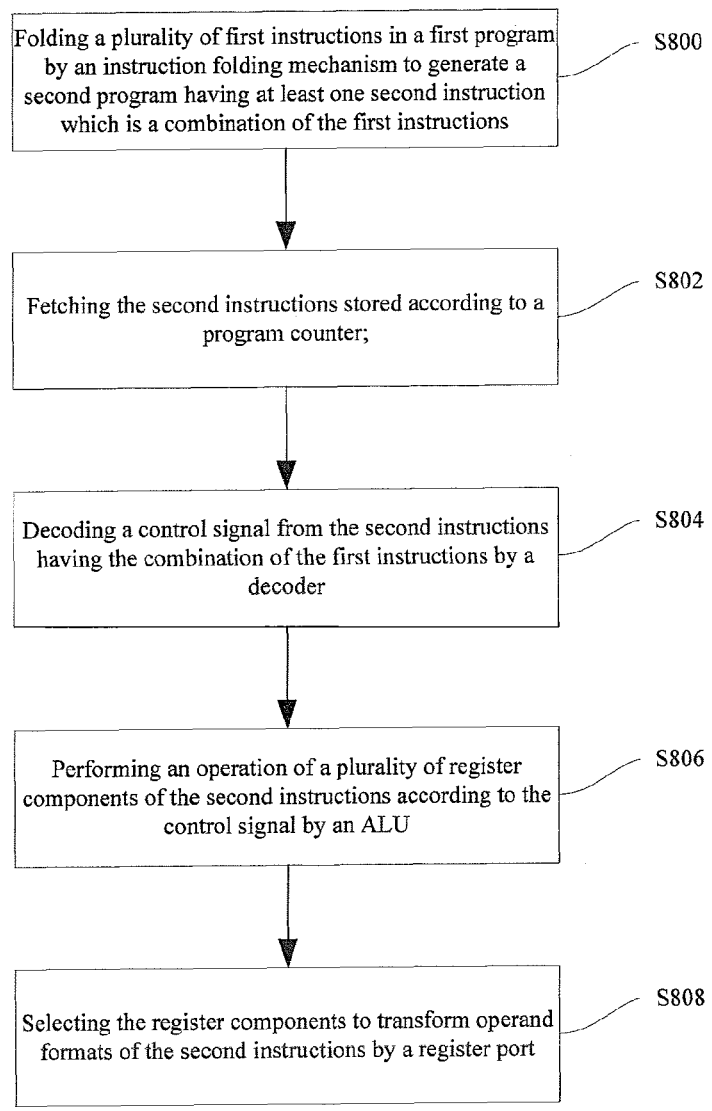
FIG. 8 shows a flow chart of performing a pixel processing system according to the present invention.

FIG. 8 shows a flow chart of performing a pixel processing system according to the present invention. Starting at step S800, a plurality of first instructions in a first program is folded by an instruction folding mechanism to generate a second program having at least one second instruction which is a combination of the first instructions.

In step S802, the second instructions are fetched according to a program counter. A control signal is decoded from the second instructions having the combination of the first instructions by a decoder, as shown in step S804. Then, in step S806, an operation of a plurality of register components of the second instructions is performed according to the control signal by an ALU. Finally, the register components are selected to transform operand formats of the second instructions by a register port in step S808.

Figure 9:
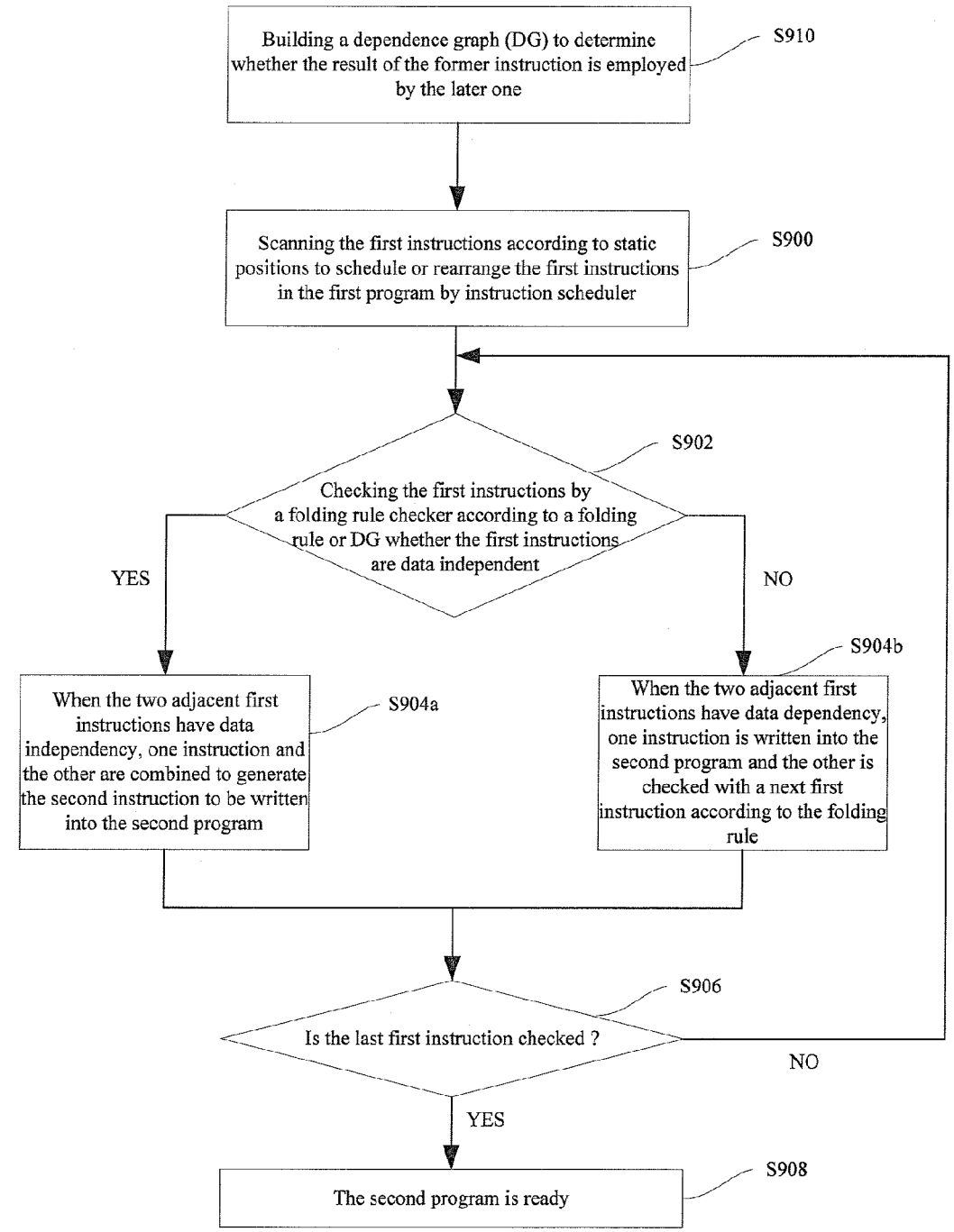
FIG. 9 shows a flow chart of performing an instruction folding mechanism of the pixel processing system in FIG. 8 according to the present invention.

FIG. 9 shows a flow chart of performing an instruction folding mechanism of the pixel processing system in FIG. 8 according to the present invention. During the step S800, the first instructions are scanned according to static positions to schedule or rearrange the first instructions in the first program or to rearrange the first instructions with data independency in step S900. Then, in step S902, the first instructions are checked by a folding rule checker according to a folding rule depending on whether the first instructions are data independent.

In step S904a, when the folding rule checker checks the first instructions by way of two adjacent first instructions and the two adjacent first instructions have data independency, one instruction and the other are combined to generate the second instruction to be written into the second program. In step S904b, when the folding rule checker checks the first instructions by way of two adjacent first instructions and the two adjacent first instructions have data dependency, one instruction is written into the second program and the other is checked with a next first instruction according to the folding rule. At step S906, the last first instruction is not processed and step S902 is proceeded again. The second program is then ready to be executed at step S908.

Preferably, during the step S900, the instruction scheduler builds a dependence graph (DG) to determine whether the result of the former instruction is employed by the later one to indicate data dependency relationship between the first instructions, where each of the instruction is a node, as shown in step S910. Specifically, in the dependence graph, when the node is connected by an edge sign, the instruction is dependent. On the contrary, if the instruction is independent, then the folding rule checker can scan the DG.

In the relationship of data independency between two adjacent first instructions, the source register of the later first instruction is different from a target register of the former first instruction. In other words, both the source register of the later first instruction and the target register of the former first instruction have a null set. Preferably, the data of the two adjacent first instructions are outputted into different components in the target register. The total number of the source operands of the first and second instructions is within a predetermined threshold value to be decoded by the decoder.

The advantages of the present invention include: (a) folding instructions with data independency into reduced instructions for generating a new program; (b) folding instructions having an identical target register and output data to different components of the target register to save the hardware cost of pixel processing system; and (c) providing a folding mechanism applied to a pixel processing system to improve the performance of the pixel processing system.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structures.

What is claimed is:

1. A pixel processing system comprising:
    an instruction folding mechanism configured to:
        check data independency between first and second instructions associated with a first program; and
        generate a third instruction associated with a second program, wherein the third instruction is a combination of the first and second instructions, and wherein the first and second instructions are operable to output data to different components in a register; and
    a pixel shader configured to:
    receive the third instruction from the instruction folding mechanism;
    decode the third instruction and execute the second program and;
    wherein the pixel shader includes a configuration to output the data to the different components in the register responsive to execution of the second program.

2. The pixel processing system of claim 1, wherein the instruction folding mechanism comprises an instruction scheduler configured to scan the first instruction and the second instruction.

3. The pixel processing system of claim 1, wherein the instruction folding mechanism further comprises a folding rule checker configured to check the data independency between the first instruction and the second instruction.

4. The pixel processing system of claim 3, wherein the instruction folding mechanism further comprises an instruction combiner configured to combine the first instruction and the second instruction to generate the third instruction in response to a determination by the folding rule checker that the first and second instructions have data independency.

5. The pixel processing system of claim 3, wherein the folding rule checker is further configured to check the data independency between the first and second instructions based on a folding rule.

6. The pixel processing system of claim 3, wherein the instruction folding mechanism is further configured to confirm data independency between the first and second instructions in response to a target register of the first instruction being different from a source register of the second instruction.

7. The pixel processing system of claim 6, wherein a total number of source operands of the first and second instructions is below a predetermined threshold value.

8. The pixel processing system of claim 1, wherein, in response to the first and second instructions having data dependency, the instruction folding mechanism is further configured to write the first instruction into the second program and to check the second instruction against a fourth instruction for data independency.

9. The pixel processing system of claim 1, wherein the pixel shader comprises:
    a decoder configured to decode a control signal of the third instruction;
    an arithmetic logic unit configured to perform an operation according to the control signal; and
    a register port configured to select corresponding register components to transform operand formats of the third instruction.

10. The pixel processing system of claim 9, wherein the pixel shader further comprises:
    an instruction memory configured to store the third instruction; and
    a fetcher configured to fetch the third instruction from the instruction memory according to a program counter.

11. The pixel processing system of claim 9, wherein the pixel shader further comprises a register unit connected to the register port and configured to store data of the corresponding register components of the third instruction.

12. The pixel processing system of claim 1, wherein the instruction folding mechanism includes a configuration to:
    determine if a second register for storage of a result of execution of a first instruction is not to be used for storage of an operand used for execution of a second instruction; and
    generate the third instruction responsive to a determination that the second register is not to be used for the storage of the result and the storage of the operand.

13. A method for processing pixels, the method comprising:
    checking data independency between first and second instructions associated with a first program by using an instruction folding mechanism;
    generating a third instruction associated with a second program by using the instruction folding mechanism, wherein the third instruction is a combination of the first and second instructions; and wherein the first and second instructions are operable to output data to different components in a register;

decoding a control signal from the third instruction by using a pixel shader; and performing an operation with the pixel shader, wherein the operation is performed according to the control signal, wherein the operation results in outputting the data to the different components in the register.

14. The method of claim 13, further comprising storing the third instruction in an instruction memory.

15. The method of claim 14, further comprising fetching the third instruction from the instruction memory according to a program counter.

16. The method of claim 13, wherein said performing an operation comprises performing, using an arithmetic logic unit, an operation on a plurality of register components of the third instruction according to the control signal.

17. The method of claim 16, further comprising selecting the plurality of register components by using a register port.

18. The method of claim 13, wherein said checking data independency comprises checking data independency according to a folding rule.

19. The method of claim 13, further comprising scanning the first and second instructions according to static positions of data in the first and second instructions.

20. The method of claim 19, wherein said scanning comprises rearranging the first and second instructions having data independency.

21. The method of claim 13, wherein the first and second instructions have data independency if a target register of the first instruction is different from a source register of the second instruction.

22. The method of claim 13, further comprising writing the first instruction into the second program and checking the second instruction for data independency with a fourth instruction if the first and second instructions have data dependency.

23. The method of claim 13, further comprising creating a dependency graph to indicate data dependency between the first and second instructions.

24. An apparatus comprising:
an instruction scheduler configured to scan first and second instructions;
a folding rule checker configured to check data independency between the first and second instructions; and
an instruction combiner configured to:
combine the first and second instructions to generate a third instruction in response to a determination by the folding rule checker that the first and second instructions have data independency, wherein the first and second instructions are operable to output data to different components in a register, and wherein the third instruction is operable to output the data to the different components in the register.

25. The apparatus of claim 24, wherein the folding rule checker is further configured to check the data independency between the first and second instructions based on a folding rule.

26. The apparatus of claim 25, wherein the folding rule checker is further configured to verify that the first and second instructions have data independency in response to a target register of the first instruction being different from a source register of the second instruction.

27. The apparatus of claim 26, wherein a total number of source operands of the first and second instructions is below a predetermined threshold value.

28. The apparatus of claim 24, wherein, in response to the first and second instructions having data dependency, the instruction combiner is further configured to write the first instruction into the second program and the folding rule checker is further configured to determine if the second instruction and a fourth instruction have data independency.

29. A method for processing pixels, the method comprising:
scanning first and second instructions by using an instruction scheduler;
checking data independency between the first and second instructions by using a folding rule checker; and
in response to a determination that the first and second instructions have data independency, combining the first and second instructions into a third instruction by using an instruction combiner, wherein the first and second instructions are operable to output data to different components in a register, and wherein the third instruction is operable to output the data to the different components in the register.

30. The method of claim 29, wherein said checking data independency comprises checking data independency according to a folding rule.

31. The method of claim 29, further comprising scanning the first and second instructions according to static positions of data in the first and second instructions.

32. The method of claim 31, wherein said scanning comprises rearranging the first and second instructions having data independency.

33. The method of claim 29, wherein the first and second instructions have data independency if a target register of the first instruction is different from a source register of the second instruction.

34. The method of claim 29, further comprising, if the first and second instructions have data dependency, writing the first instruction into the second program by using the instruction combiner and checking the second instruction for data independency with a fourth instruction by using the folding rule checker.

35. A pixel processing system comprising:
an instruction folding mechanism configured to:
determine if a register for storage of a result of execution of a first instruction is not to be used for storage of an operand used for execution of a second instruction; and
generate a third instruction associated with a second program, wherein the third instruction is a combination of the first and second instructions, responsive to a determination that the register is not to be used for the storage of the result and the storage of the operand; and
a pixel shader configured to:
receive the third instruction from the instruction folding mechanism; and
decode the third instruction and execute the second program.

36. The pixel processing system of claim 35, wherein the pixel shader comprises:
a decoder for decoding a control signal from the third instruction having the combination of the first instruction and the second instruction;
an arithmetic logic unit (ALU) connected to the decoder for performing an operation of a plurality of register components of the third instruction according to the control signal; and a register port connected to the ALU for selecting the register components to transform operand formats of the third instruction.

37. The pixel processing system according to claim 36, wherein the pixel shader further comprises:
an instruction memory for storing the third instruction of the second program; and
a fetcher connected to the decoder for fetching the third instruction stored in the instruction memory according to a program counter.

38. The pixel processing system according to claim 36, wherein the pixel shader further comprises a register unit connected to a port unit for storing data of the register components of the third instruction.

39. The pixel processing system of claim 35, wherein the first and second instructions are operable to output data to different components in an output register.

40. The pixel processing system of claim 39, wherein the pixel shader includes a configuration to output the data to the different components in the output register responsive to execution of the second program.

41. A method comprising:
determining if a register for storage of a result of execution of a first instruction is not to be used for storage of an operand used for execution of a second instruction;
generating a third instruction associated with a second program, wherein the third instruction is a combination of the first and second instructions, responsive to a determination that the register is not to be used for the storage of the result and the storage of the operand; and
decoding the third instruction and executing the second program.

42. The method of claim 41, further comprising:
decoding a control signal from the third instruction having the combination of the first instruction and the second instruction;
performing an operation of a plurality of register components of the third instruction according to the control signal; and
selecting the register components to transform operand formats of the third instruction.

43. The method of claim 41, further comprising:
storing the third instruction of the second program in an instruction memory; and
fetching the third instruction stored in the instruction memory according to a program counter.

44. The method of claim 42, further comprising storing data of the register components of the third instruction in a register unit.

45. The method of claim 41, wherein the first and second instructions are operable to output data to different components in an output register.

46. The method of claim 45, wherein executing the second program outputs data to the different components in the output register.

* * * * *